US012281498B2

(12) United States Patent
Vonaesch et al.

(10) Patent No.: US 12,281,498 B2
(45) Date of Patent: Apr. 22, 2025

(54) SLIDING DOOR

(71) Applicant: Inventio AG, Hergiswil (CH)

(72) Inventors: Jonas Vonaesch, Lucerne (CH); Florian Trosch, Erlenbach ZH (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/248,084

(22) PCT Filed: Oct. 6, 2021

(86) PCT No.: PCT/EP2021/077572
§ 371 (c)(1),
(2) Date: Apr. 6, 2023

(87) PCT Pub. No.: WO2022/078840
PCT Pub. Date: Apr. 21, 2022

(65) Prior Publication Data

US 2023/0366241 A1 Nov. 16, 2023

(30) Foreign Application Priority Data

Oct. 13, 2020 (EP) .................................... 20201581

(51) Int. Cl.

| | |
|---|---|
| ***E05B 65/00*** | (2006.01) |
| ***E05B 63/22*** | (2006.01) |
| ***E05B 65/08*** | (2006.01) |
| ***E06B 3/46*** | (2006.01) |
| *E05D 15/06* | (2006.01) |

(52) U.S. Cl.
CPC .............. *E05B 63/22* (2013.01); *E05B 65/08* (2013.01); *E06B 3/4654* (2013.01); *E05D 15/0604* (2013.01)

(58) Field of Classification Search
CPC ........ E05B 63/22; E05B 65/08; E06B 3/4654; E05D 15/0604
See application file for complete search history.

(56) References Cited

FOREIGN PATENT DOCUMENTS

| | | | | |
|---|---|---|---|---|
| AT | 507815 A1 | 8/2010 | | |
| DE | 10163061 B4 | 6/2003 | | |
| WO | WO-2020182513 A1 * | 9/2020 | ......... | E05D 15/0604 |

OTHER PUBLICATIONS

Translated foreign document (Year: 2020).*
Drawings from WO 2020/182513 A1 with the foreign language text translated.

* cited by examiner

*Primary Examiner* — Daniel J Troy
*Assistant Examiner* — Daniel Alvarez
(74) *Attorney, Agent, or Firm* — William J. Clemens; Shumaker, Loop & Kendrick, LLP

(57) ABSTRACT

A sliding door includes a bar that is movable in the closing and opening direction of a door leaf the sliding door. When the sliding door is in a closed state, the door separates a first space from a second space. A door frame in which the door is mounted has a bar catch, wherein the bar engages in the bar catch when the door leaf is in the closed state. The engagement can be released by movement of the door leaf, and therefore movement of the bar, in the direction of the normal of the door leaf plane.

11 Claims, 3 Drawing Sheets

Detail A

Detail A

SLIDING DOOR

FIELD

The invention relates to a sliding door with a locking device, in particular an unlocking device which can be released by pressure on a door leaf of the sliding door.

BACKGROUND

DE 101 63 061 B4 discloses a sliding door which comprises a door leaf support which can be displaced in the horizontal direction between two wall shells and on which two door leaves which can be spread in opposite directions are mounted. When the sliding door is in the closed state, the outer surfaces of the spread door leaves are flush with the outer surfaces of the two wall shells. The door leaf support is horizontally displaceable on a linear guide and is displaceable by a traction means drive driven by an electric motor. The door leaves are connected in the upper region thereof to the sliding door leaf support via control arms forming a parallelogram guide system in each case, so that a distance, measured at a right angle to the outer surfaces of the wall elements, between the door leaf and the door leaf support frame can be changed such that the outer surface of the door leaf can be positioned, in the open state of the sliding door, between the two wall elements and, in the closed state, in the door opening and in alignment with the outer surface of the wall element assigned to the door leaf.

Sliding doors of this kind can be used as entrance doors for apartments or room dividers, for example. Such doors therefore segregate a private area from a non-private area and are usually automatically locked or lockable in their closed state, in order to prevent unauthorized access to the private area. A power failure during the closed or locked state therefore means that the sliding door cannot be unlocked or opened by the electric drive.

SUMMARY

The invention is based on the object of providing a sliding door with a locking device which, even in a de-energized state, enables an opening or unlocking of the sliding door from sides of a private space, but on the other hand cannot be unlocked from the non-private space.

The object is achieved by a sliding door with a bar which is movable in the closing and opening direction of a door leaf of the sliding door, wherein the sliding door in its closed state separates a first space from a second space, and a door frame comprising a bar catch, wherein the bar engages in the bar catch when the door leaf is in a closed state, and the engagement is releasable by moving the door leaf and therefore the bar in the direction of the normal of the door leaf plane.

The invention is based on the finding that a displacement movement of the door leaf can be used to unlock the door leaf. For this purpose, the bar is connected to the door leaf triggering the unlocking in such a way that the displacement of the door leaf can be used to release the bar from the bar catch and accordingly unlock the sliding door. Accordingly, by means of a displacement of the door leaf initiated from a private space, the closed and locked sliding door can be unlocked, and consequently can in particular be opened manually even in a de-energized state. Preferably, the sliding door is locked at all times in its closed position.

In a further development of the sliding door, the bar is connected to the door leaf in such a way that the releasing of the bar in the direction of the normal of the door leaf plane can be brought about by pressing performed in the first space substantially in the direction of the normal of the door leaf plane against the closed door leaf. Accordingly, the bars and bar catch are arranged such that the bar substantially executes a horizontal movement, in order to be transferred from its unlocked position to its locked position, or from its locked position to its unlocked position. Specifically, the latter can be easily executed by pressing against the door leaf in the first space. Accordingly, the locking device comprising the bar and the bar catch is arranged in such a way that the bar can be moved out of the bar catch by the movement performed in the direction of the normal of the door leaf plane, and the sliding door is therefore unlocked.

In a further development of the sliding door, the bar is connected to the door leaf in such a way that the bar remains in its locked position by being pressed substantially in the direction of the normal of the door leaf plane in the second space against the closed door leaf. Consequently, it is ensured that a person who is in the non-private space at the sliding door cannot unlock the sliding door by simply pressing against the door leaf. Consequently, the privacy or safety within the private area, that is to say the first space, is ensured.

In a further development of the sliding door, a static spring element fixed to the bar or the door frame is arranged between the door frame and the bar in such a way that the bar is pressed into its locked position. In this way, it can be ensured that the sliding door is securely locked in its closed position without additional measures having to be taken for the bar to engage in the bar catch to securely lock the sliding door. This is necessary, in particular, because the bar executes a pivoting movement to unlock or lock in the horizontal plane, and can therefore not fall into its locked position by gravity.

In a further development of the sliding door, the door leaf is movable via control arms forming a parallelogram guide system in such a way that a distance between the door leaf and the bar measured in the direction of the normal of the door leaf plane is changeable such that this distance, when the sliding door is in a position that does not correspond to the closed position of the sliding door, is less than the measured distance when the sliding door is in the closed position, wherein each of the control arms extends from the door leaf to the bar proportionally in the opening direction of the sliding door. Accordingly, by pressing or displacing the door leaf by a force directed substantially in the direction of a normal of the door leaf plane, both unlocking and movement of the door leaf in the opening direction can be achieved. When the sliding door is in the closed position, the door leaf can accordingly be designed to be flush with the wall elements located on the side of the door opening, and can be displaced behind the corresponding wall element from the perspective of the user while the sliding door is being opened.

Preferably, such a sliding door comprising the parallelogram guide system comprises a second door leaf, which second door leaf is arranged on the other side of the bar, wherein the second door leaf remains in its locked position in the direction of the normal of the door leaf plane by pressing performed in the second space against the closed second door leaf.

For example, international application PCT/EP2020/055411 (WO 2020/182513 A1) describes such a sliding door with which the door leaf is movable via control arms forming a parallelogram guide system, the disclosure of which is incorporated herein by reference.

As an alternative to the parallelogram guide system, the door leaf/leaves can also be guided on, preferably telescopic, linear guide systems. Such linear guide systems can be designed, for example, as a round rod in a bore, or also as a linear ball bearing.

In a further development of the sliding door, the door frame has a second bar catch, which second bar catch is arranged on the other side of the bar with respect to the first bar catch, so that the bar is arranged substantially in the middle between the first and second bar catches. Accordingly, the position of the bar can be changed in such a way that the bar is in engagement with the second bar catch instead of the first bar catch when the sliding door is in the locked position. In this way, the sliding door can be unlocked by pressing from the second space instead of the first space. Before installing the sliding door, such a change in the position of the bar can cause the sliding door installed later to have an opposite opening direction. Furthermore, such a second bar catch can be used to press the bar into interaction for example by means of the spring element of the first bar catch.

In addition, the bar can be preinstalled in a third position such that an engagement of the bar which locks the sliding door with the, or one of the, bar catches is not enabled. In this way, the function of the locking device can be disabled. If one of the above-described spring element is present, its effect can also be disabled.

Preferably, the first and the second bar catch can be designed as an integral element, in order to facilitate installation of the locking device within the door frame.

In a further development of the sliding door, the bar has a recess, wherein the sliding door is locked in its closed position when the bar catch engages in the recess of the bar, wherein the bar catch has a contact surface designed as a flank, which contact surface comes into contact with the bar catch when the bar is moved in the opening direction of the sliding door, and the contact surface forms a phase angle. In this way, the locking bar can be changed in its position such that, in a simple arrangement, the sliding door can be unlocked from the first space by moving the door leaf. By means of a contact surface formed as such a flank, it is possible that an electrical drive which acts exclusively in the opening direction of the at least one door leaf can transfer the sliding door from its closed position into an opening movement, or the at least one door leaf can be brought out of its unlocked position without the sliding door having to be unlocked by means of an additional drive. This means that no additional device is necessary to displace the bar perpendicular to a door opening or closing direction of the sliding door, in order to bring about the unlocking.

In a further development of the sliding door, the control arm forms an acute angle to the door leaf plane, wherein the acute angle is greater than the phase angle. In this way, it can be achieved that the door leaf cannot be brought out of its unlocked position when pressing performed in the direction of the normal of the door leaf plane in the second space is substantially in the direction of the normal of the door leaf plane against the closed door leaf, but nevertheless the door leaf can be brought from its unlocked position by means of an electric drive which acts exclusively in the door opening direction.

DESCRIPTION OF THE DRAWINGS

The invention is explained in greater detail below with reference to drawings. In the figures.

DETAILED DESCRIPTION

Figure 1:
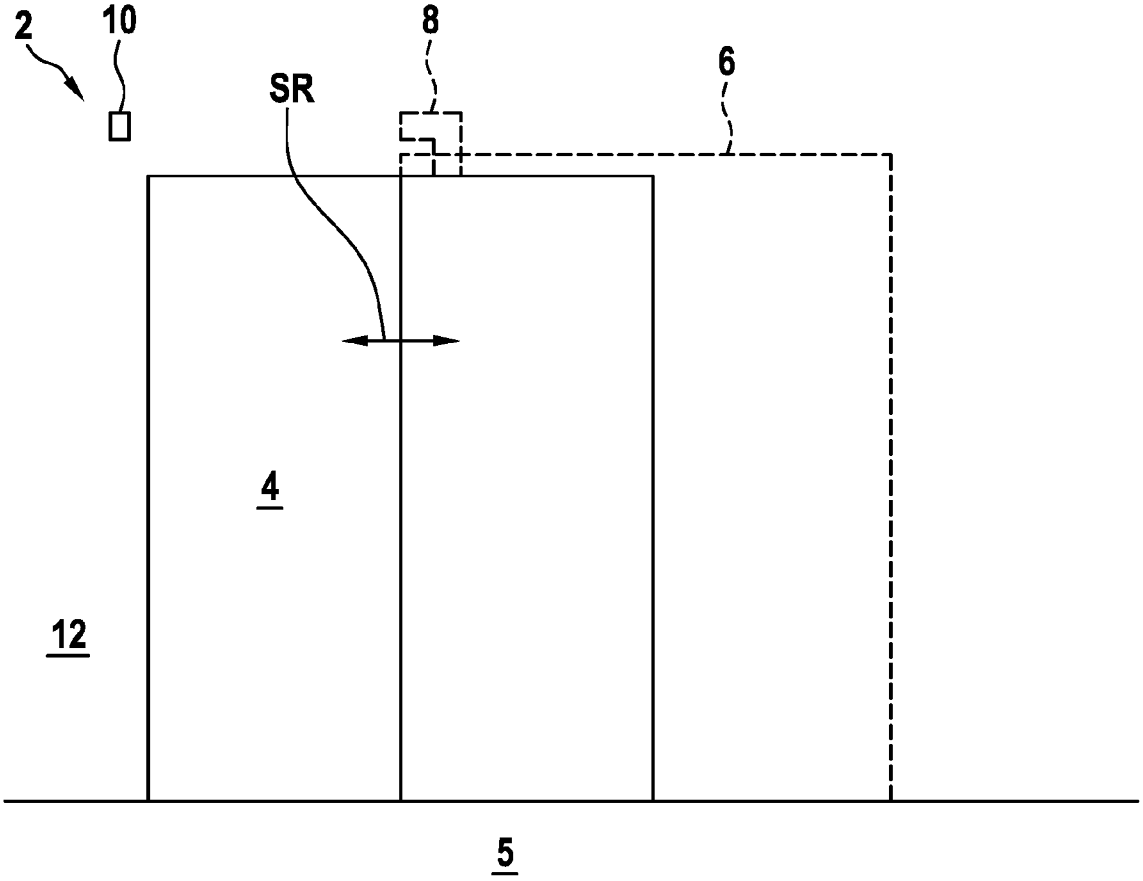
FIG. 1: shows an exterior view of a sliding door installed in a door opening.

FIG. 1 shows a sliding door 2. The sliding door 2 comprises a door frame 12, which comprises wall elements. A door opening 4 is recessed within these wall elements. The sliding door 2 furthermore comprises at least one door leaf 6, which is movable in a closing or opening direction SR shown according to FIG. 1. The door opening 4 and the door frame 12 are delimited at their respective lower ends by a floor 5. The sliding door 2 is shown in a partially open position, so that the door leaf 6 is concealed in part by the door frame 12. Accordingly, the edges of the door leaf covered by the door frame 12 are shown by dashed lines. In addition to a plurality of other components (not shown) of the sliding door, a locking device 8, 10 of the sliding door 2 is indicated. The locking device 8, 10 comprises a bar 8 and a bar catch 10. The bar 8 can be arranged above the door opening 4 with the door leaf 6. Alternatively, the bar 8 can be arranged at the lower end of the door leaf 6 or between the upper and lower ends. In a corresponding manner, the bar catch 10 is arranged at the door frame 12, in order to be able to interact with the bar 8 when the door leaf 6 is in the closed position.

Figure 2:
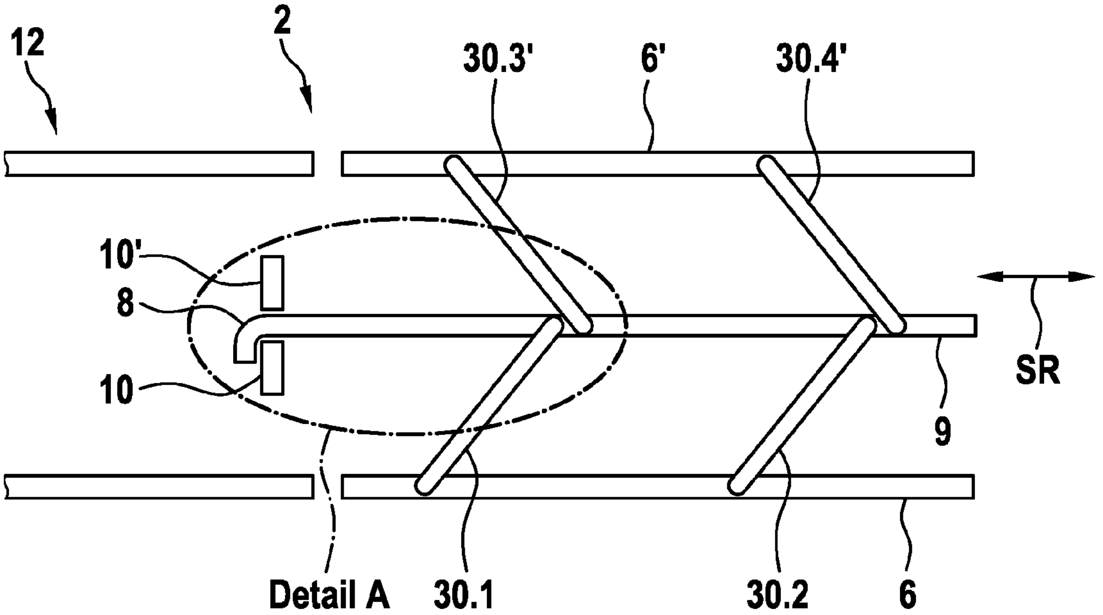
FIG. 2: shows a horizontal section of the sliding door shown in FIG. 1.

FIG. 2 shows a horizontal section of an exemplary sliding door 2 in its closed position. The door leaf of the sliding door 2 is in its locked position. Regarding structural features of the embodiment shown in FIG. 2, reference is made to the description of the figures in the international application PCT/EP2020/055411. The difference that is decisive in FIG. 2 in comparison with this prior international application is the locking device 8, 10. The sliding door has a support frame 9, two door leaves 6, 6', control arms 30.1, 30.2, 30.3', 30.4', and a door frame 12, and these elements interact in the manner described according to PCT/EP2020/055411.

Furthermore, the exemplary sliding door comprises a locking device 8, 10, 10', wherein the bar 8 can be fixed to the support frame 9 and can interact with bar catches 10, 10'. The bar 8 and the bar catches 10, 10' are arranged at the same height, wherein the bar 8 is arranged between the bar catches 10, 10' when the sliding door 2 is in the closed position. Consequently, it is possible for the bar 8 to be able to be fixed in advance in two different positions, so that the bar 8 can interact with one of these bar catches 10, 10' to lock the sliding door. If necessary, during installation of the sliding door, the bar 8 can be repositioned by rotating 180° about an axis arranged parallel to the closing or opening direction SR, so that the latch 8 engages in the second bar catch 10' instead of the first bar catch 10 when the sliding door 2 is in the locked position.

Alternatively, the second bar catch 10', with which second bar catch 10' the bar 8 is not engaged when the sliding door 2 is in the locked position, can be replaced by any element of the door frame 12. Furthermore alternatively, the second bar catch 10' can be omitted.

Figure 3A:
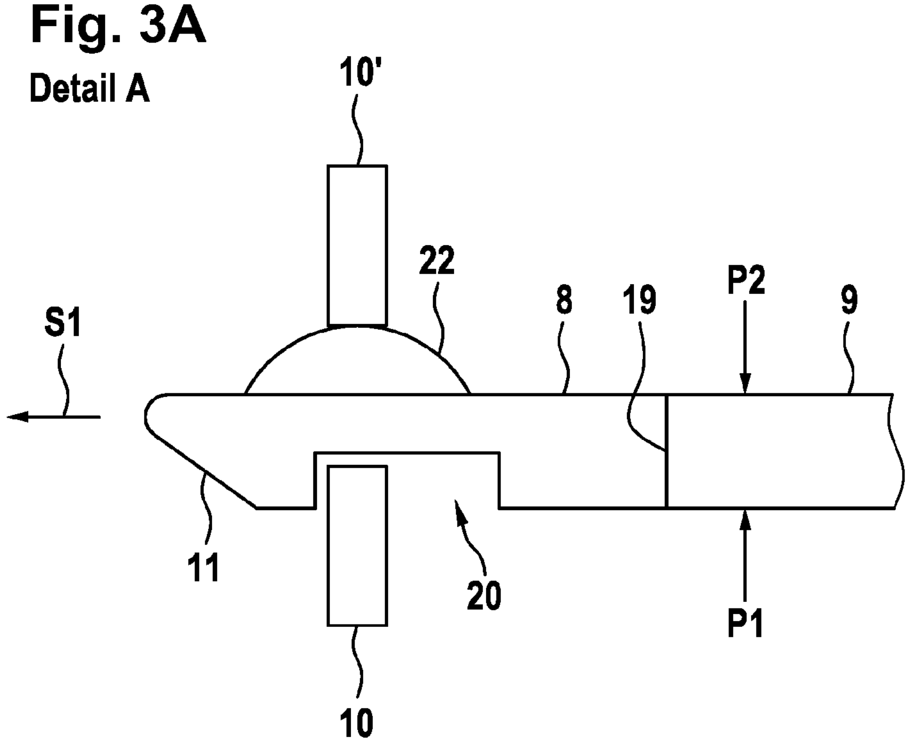
FIG. 3A: shows a first embodiment variant of a locking device of the door.

FIG. 3A shows a detail A of FIG. 2. The bar 8 has a recess 20 which, when the sliding door 2 is in the closed position, latches into the bar catch 10 which causes the sliding door 2 to lock. In order to support the latching of the bar 8 into the bar catch 10, a spring element 22 can interact with a component 10' of the door frame on the opposite side of the recess 20, so that the bar 8 interacts with the recess 20 of the bar catch 10 in such a way that the sliding door is in its locked position. If necessary, this component 10' can be formed by a second bar catch 10'.

The bar 8 can be detachably fixed to the support frame 9 at a surface 19 in such a way that the arrangement of the bar 8 can be changed by rotating 180° about the axis arranged parallel to the closing or opening direction. Accordingly, the recess 20 can also interact with the second bar catch 10'.

For the purpose of locking when closing the sliding door, the bar 8 can have a chamfer on its front edge 11 which, when an electric drive only acts in the closing direction S1, causes the bar 8 to be deflected by the bar catch 10 and consequently, when the sliding door is completely closed, is transferred to its locked position by the bar 8 snapping back.

By means of a force P1 acting on the support frame 9, which acts substantially in the direction of the normal of the door leaf plane, the lock is releasable, that is to say, the recess 20 of the bar 8 does not interact with the bar catch 10 when the bar 8 is displaced from a door opening or closing movement SR. After unlocking, the sliding door can be opened.

If contrastingly a force P2 directed counter to the force P1 acts on the support frame 9, the bar 8 is pressed into the bar catch 10. Accordingly, the lock is not released, so that the sliding door remains in its locked position. Both the force P1 and the force P2 can be produced by pressing on the corresponding door leaf substantially in the direction of the normal of the door leaf plane.

Figure 3B:
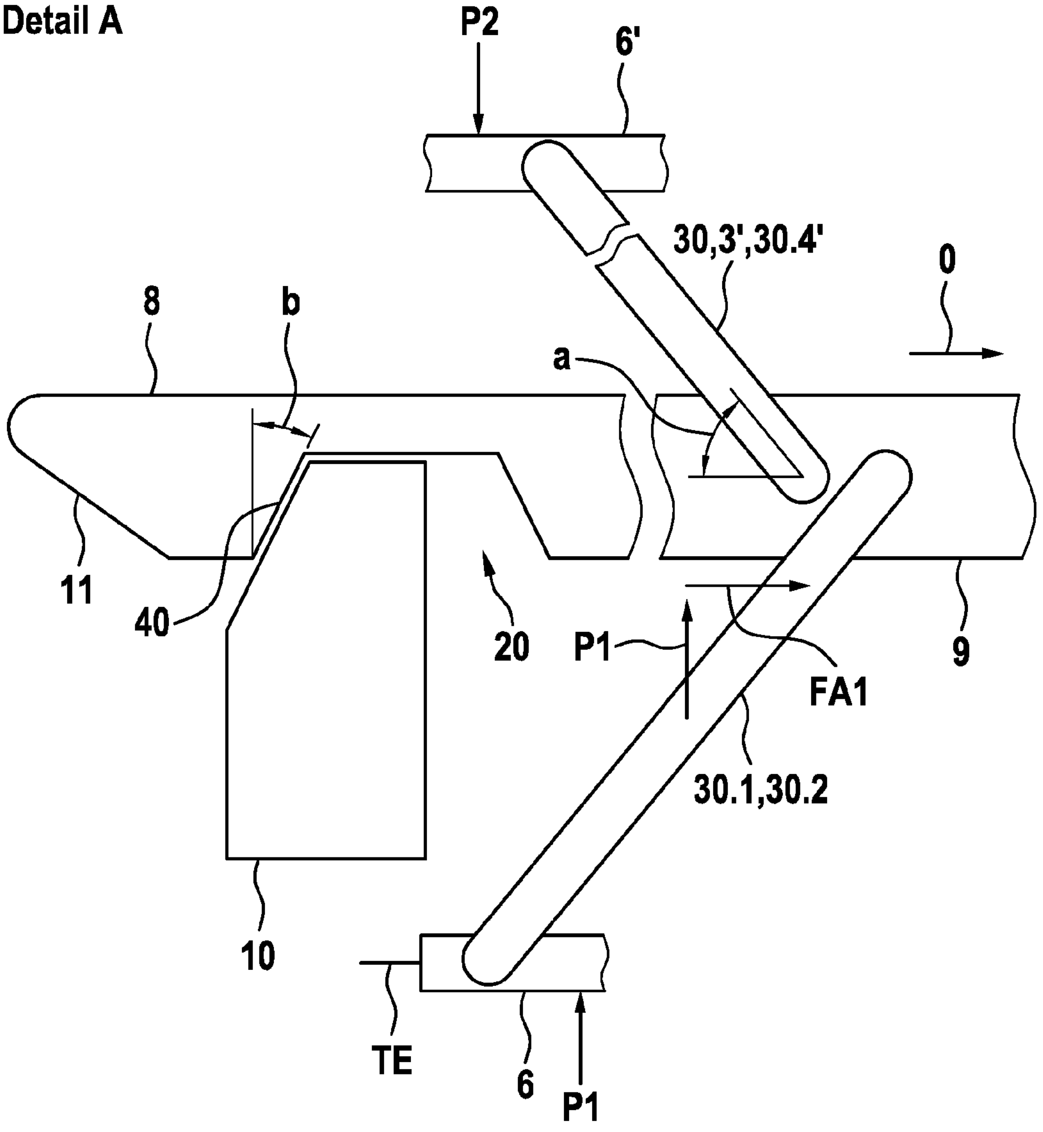
FIG. 3B: shows a second embodiment variant of the sliding door.

FIG. 3B shows an alternative embodiment variant of a locking device in comparison to FIG. 3A. The bar 8 shown in FIG. 3B has a recess 20 with a contact surface 40 designed as a flank. The contact surface 40 forms a phase angle b. If the bar 8 connected to the door leaf support frame 9 is moved in the opening direction O of the door, the bar 8 can slide out of the lock.

A force P1, which triggers the unlocking, acts on the door leaf 6. The control arm 30.1, 30.2 mounted on the support frame 9 forms an acute angle to the support frame 9 when the sliding door is in the closed position or locked position. Accordingly, the force P1 acting substantially in the direction of the normal of the door leaf generates a force FA1 that acts on the support frame 9 in the opening direction O of the sliding door. This means that exclusively the force P1 acting substantially in the direction of the normal of the door leaf plane TE causes both the unlocking and subsequently an opening movement of the sliding door.

If, in contrast, a force P2 oriented substantially in the direction of the normal of the door leaf plane TE acts on the second door leaf 6', locking of the sliding door is ensured when an acute angle a formed between the control arm 30.3', 30.4' and the door leaf plane TE is greater than the phase angle b. If, however, the phase angle b were greater than the acute angle a, there would be the risk that a force exerted on the second door leaf 6' could unlock the sliding door, so that a private space behind the closed or locked sliding door would no longer be secured.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding door comprising:

a door frame having a door opening;

a door leaf mounted at the door opening and being movable in a closing direction and an opposite opening direction, wherein the door leaf in a closed state of the sliding door separates a first space from a second space;

a bar connected to the door leaf;

a bar catch arranged at the door frame, wherein the bar engages in the bar catch in a locked position when the door leaf is in the closed state and the bar catch remains arranged at the door frame when the door leaf is moved away from the bar catch in the opening direction;

the door leaf being movable via control arms forming a parallelogram guide system or a linear guide system such that a distance between the door leaf and the bar measured in a direction normal to a plane of the door leaf is changeable;

wherein the engagement of the bar with the bar catch is released by movement of the door leaf, and movement of the bar by the door leaf, both of the movements being in the direction of the normal to the door leaf plane, and wherein the movement of the door leaf in the direction of the normal to the door leaf plane results from a pressing against the closed door leaf performed from the first space substantially in the direction of the normal to the door leaf plane; and wherein the bar remains engaged with the bar catch when a pressing in the direction of the normal of the door leaf plane against the closed door leaf is performed from the second space.

2. The sliding door according to claim 1 including a spring element arranged on the bar or on the door frame and positioned between the door frame and the bar such that the spring element presses the bar into the engagement with the bar catch.

3. The sliding door according to claim 1 wherein the parallelogram guide system is formed by a plurality of control arms such that a distance between the door leaf and the bar measured in the direction of the normal to the door leaf plane is changeable, wherein when the door leaf is not in the closed state the distance is less than when the door leaf is in the closed state, and wherein each of the control arms extends from the door leaf to the bar proportionally in the opening direction of the door leaf.

4. The sliding door according to claim 3 wherein the door leaf is a first door leaf and including a second door leaf extending parallel to and spaced from the first door leaf, the bar being arranged between the first door leaf and the second door leaf, wherein the second door leaf remains in the closed state when pressing in the direction of the normal to the door leaf plane from the second space against the second door leaf.

5. The sliding door according to claim 4 wherein the bar catch is a first bar catch and including a second bar catch arranged at the door frame, and wherein the bar extends between the first bar catch and the second bar catch when the first door leaf and the second door leaf are in the closed state.

6. The sliding door according to claim 3 wherein the bar has a recess formed therein, wherein the sliding door is locked in the closed state when the bar catch engages in the recess of the bar, wherein the bar has a contact surface formed as a flank and the contact surface comes into contact with the bar catch when the bar is moved in the opening direction of the door leaf, and wherein the contact surface forms a phase angle relative to the normal to the door leaf plane.

7. The sliding door according to claim 6 wherein at least one of the control arms forms an acute angle relative to the door leaf plane and the acute angle is greater than the phase angle.

8. A sliding door comprising:

a door frame having a door opening;

a pair of door leaves mounted at the door opening, the door leaves extending parallel to one another and being spaced apart, the door leaves being movable together in a closing direction and an opposite opening direction, wherein the door leaves in a closed state of the sliding door separate a first space from a second space;

a bar being arranged between and connected to the door leaves;

a bar catch arranged at the door frame between a first of the door leaves and the bar, wherein the bar engages in the bar catch in a locked position when the door leaves are in the closed state and the bar catch remains arranged at the door frame when the door leaves are moved away from the bar catch in the opening direction;

wherein the door leaves are movable via control arms forming a parallelogram guide system or a linear guide system such that a distance between each of the door leaves and the bar measured in a direction normal to a plane of the door leaves is changeable;

wherein the engagement of the bar with the bar catch is released by movement of the first door leaf, and movement of the bar by the door leaf, both of the movements being in the direction of the normal to the door leaf plane, and wherein the movement of the first door leaf in the direction of the normal to the door leaf plane results from a pressing against the closed first door leaf performed from the first space substantially in the direction of the normal to the door leaf plane; and wherein the bar remains engaged with the bar catch when a pressing in the direction of the normal of the door leaf plane against a closed second of the door leaves is performed from the second space.

9. The sliding door according to claim 8 including a spring element arranged on the bar or on the door frame and positioned between the door frame and the bar such that the spring element presses the bar into the engagement with the bar catch.

10. The sliding door according to claim 8 wherein the parallelogram guide system is formed by a plurality of control arms such that a distance between each of the first and second door leaves and the bar measured in the direction of the normal to the door leaf plane is changeable, wherein when the door leaves are not in the closed state the distance is less than when the door leaves are in the closed state, and wherein each of the control arms extends from an associated one of the first and second door leaves to the bar proportionally in the opening direction of the door leaves.

11. The sliding door according to claim 8 wherein the bar catch is a first bar catch and including a second bar catch arranged at the door frame between the second door leaf and the bar, wherein the bar extends between the first bar catch and the second bar catch when the first door leaf and the second door leaf are in the closed state, and wherein the bar is rotatable between a first position to engage with the first bar catch and a second position to engage with the second bar catch.

* * * * *